US009873536B2

(12) United States Patent
Pace et al.

(10) Patent No.: US 9,873,536 B2
(45) Date of Patent: *Jan. 23, 2018

(54) CONTAINER HANDLING MACHINE AND METHOD

(71) Applicant: Sidel S.p.A. CON SOCIO UNICO, Parma (IT)

(72) Inventors: Raffaele Pace, Parma (IT); Stefano Molinari, Parma (IT); Matteo Vignali, Parma (IT)

(73) Assignee: SIDEL S.P.A. CON SOCIO UNICO, Parma (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,546

(22) Filed: Aug. 28, 2015

(65) Prior Publication Data
US 2016/0059982 A1 Mar. 3, 2016

(30) Foreign Application Priority Data

Aug. 29, 2014 (EP) .................................... 14182779

(51) Int. Cl.
*B65B 57/02* (2006.01)
*B65C 9/04* (2006.01)
(Continued)

(52) U.S. Cl.
CPC .......... *B65B 57/02* (2013.01); *B29C 67/0048* (2013.01); *B65C 3/26* (2013.01);
(Continued)

(58) Field of Classification Search
CPC ......... B29C 67/0048; B29L 2031/7158; B65B 3/12; B65B 57/02; B65B 57/04;
(Continued)

(56) References Cited

U.S. PATENT DOCUMENTS

2009/0293436 A1  12/2009  Miyazaki et al.
2015/0040515 A1* 2/2015  Molinari ................... B65C 9/04
                                                      53/127

FOREIGN PATENT DOCUMENTS

DE    10 2008 02624    12/2009
WO    WO 2006/068511    6/2006
(Continued)

OTHER PUBLICATIONS

Extended European Search Report dated Feb. 20, 2015 by the European Patent Office in counterpart European Patent Application No. 14182779.0.

*Primary Examiner* — George Koch
(74) *Attorney, Agent, or Firm* — Finnegan, Henderson, Farabow, Garrett & Dunner, L.L.P.

(57) ABSTRACT

A container handling machine having at least one operative unit is disclosed. The container handling machine includes a plunger configured to selectively move along a longitudinal axis and to deform a base of a container from a first swollen configuration to a second inwardly-retracted configuration, and an actuator configured to selectively move the plunger along the longitudinal axis between a first position, in which the plunger is detached from the base of the container, and a second position, in which the plunger deforms the base to the second configuration. The container handling machine further includes a control unit configured to selectively activate the actuator for producing a first stroke of the plunger along the longitudinal axis between the first position and the second position, in order to deform the base of the container.

22 Claims, 7 Drawing Sheets

(51) Int. Cl.
*B29C 67/00* (2017.01)
*B65C 3/26* (2006.01)
B67C 3/22 (2006.01)
B29L 31/00 (2006.01)

(52) U.S. Cl.
CPC ......... *B65C 9/04* (2013.01); *B29L 2031/7158* (2013.01); *B67C 2003/226* (2013.01)

(58) Field of Classification Search
CPC ......... B65B 57/06; B65B 57/08; B65B 61/24; B65C 3/14; B65C 3/26; B65C 9/04; B67C 2003/226; B67C 2003/227; B67C 3/007; B67C 3/045
USPC .......................................................... 156/64
See application file for complete search history.

(56) References Cited

FOREIGN PATENT DOCUMENTS

| | | |
|---|---|---|
| WO | WO 2007/127337 A2 | 11/2007 |
| WO | WO 2012/161350 A1 | 11/2012 |
| WO | WO 2013/139874 A1 | 9/2013 |
| WO | WO 2013139874 A1 * | 9/2013 ............... B65C 9/04 |

* cited by examiner

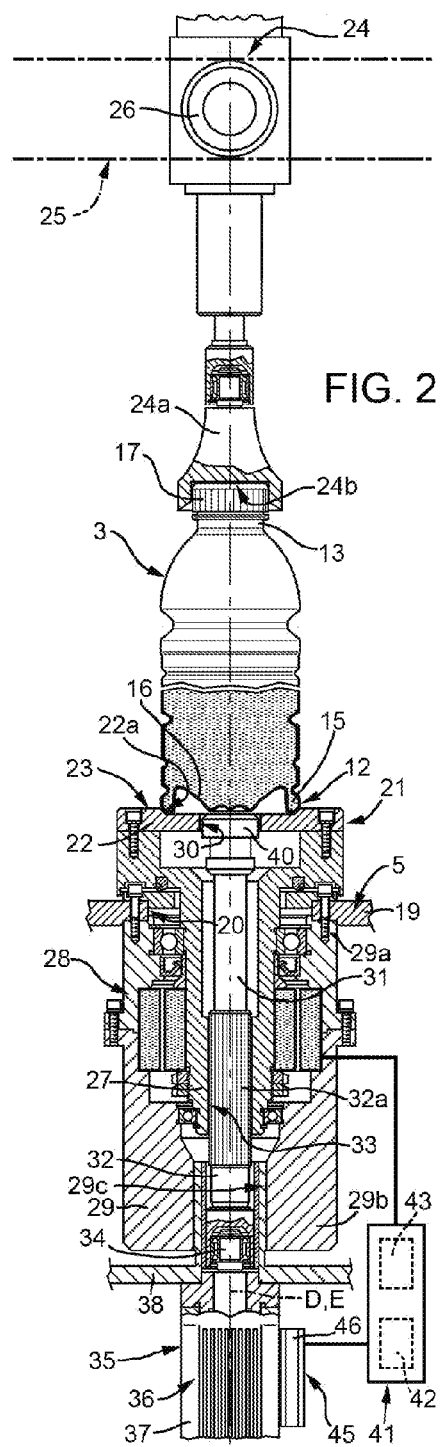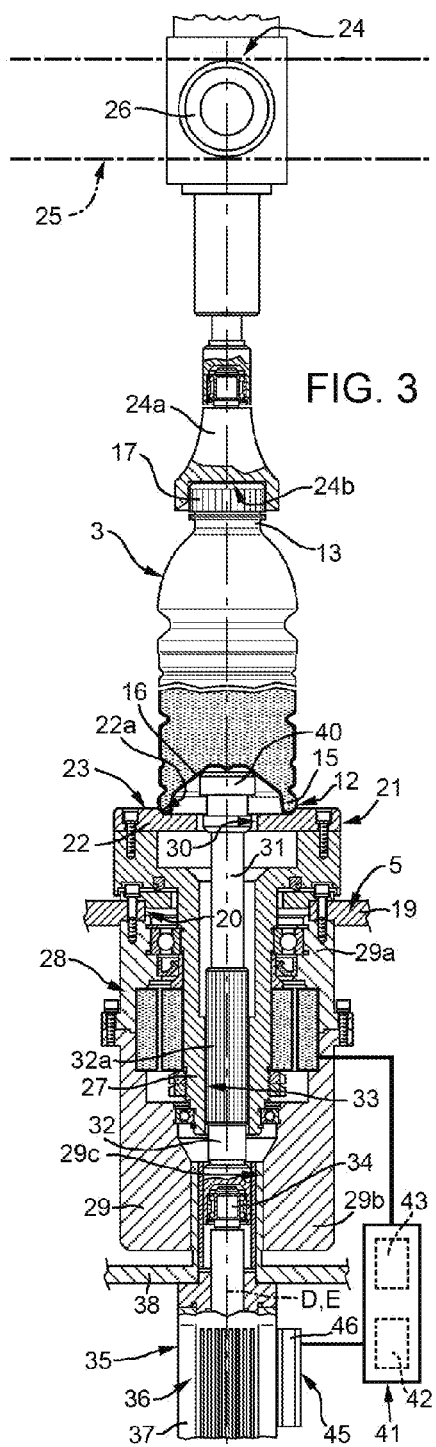

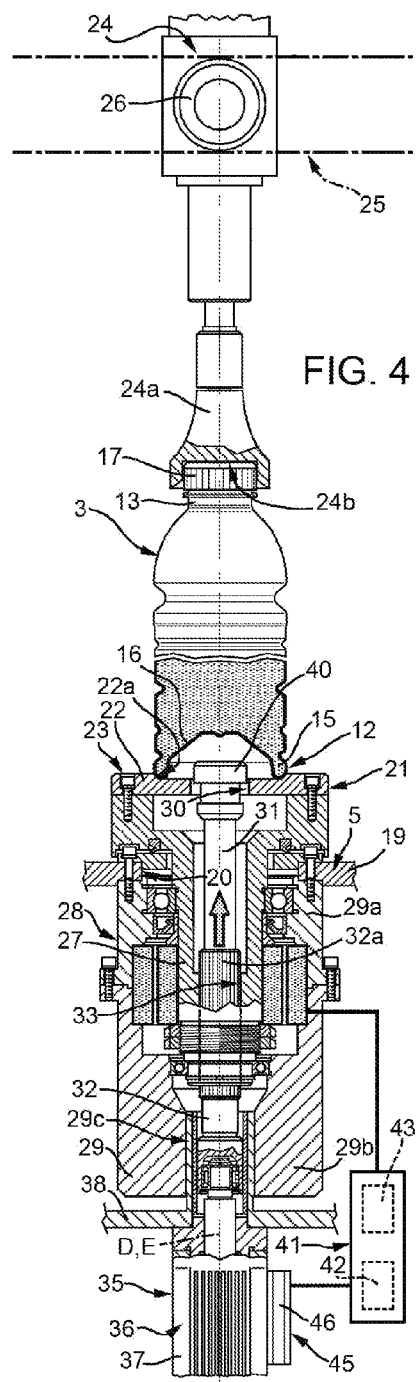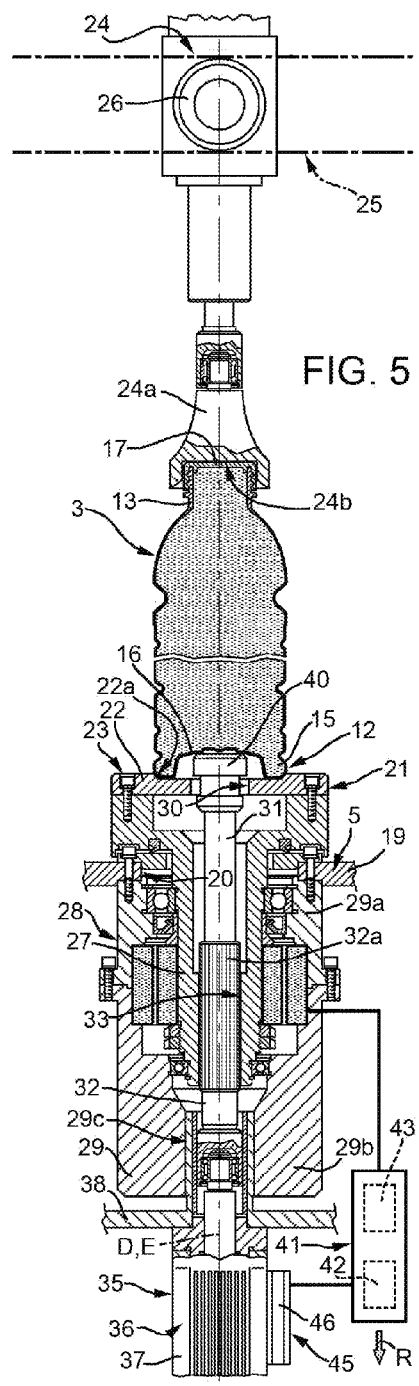

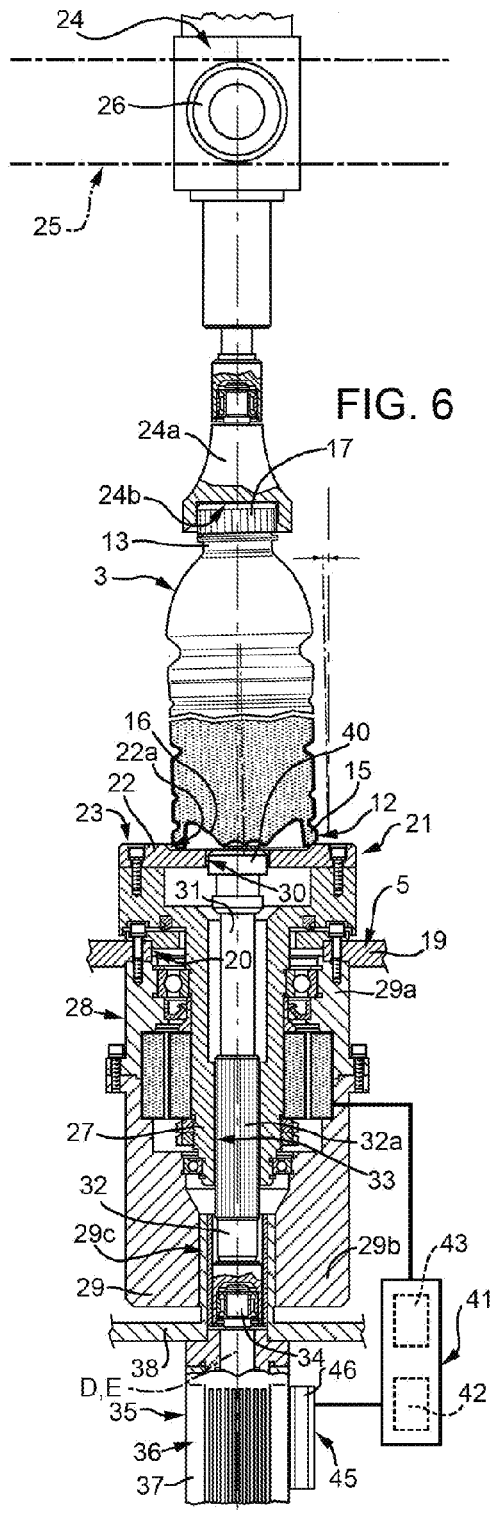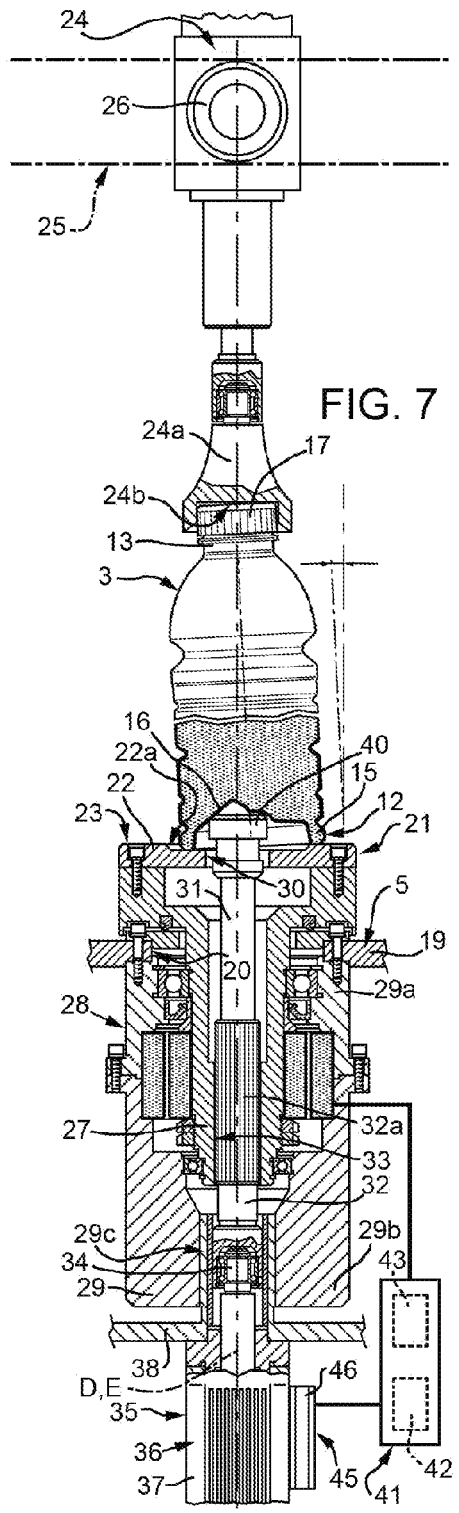

CONTAINER HANDLING MACHINE AND METHOD

CROSS-REFERENCE TO RELATED APPLICATIONS

This application claims the benefit of priority of European Patent Application No. 14182779.0, filed Aug. 29, 2014, which is incorporated herein by reference.

TECHNICAL FIELD

The present invention relates to a machine and a method for handling containers, such as for example plastic bottles.

More specifically, the present invention relates to a machine and a method for labelling and transforming filled and closed containers.

The present invention is advantageously but not exclusively applicable in the sector of plastic hot fill containers, which the following description will refer to, although this is in no way intended to limit the scope of protection as defined by the accompanying claims.

BACKGROUND ART

As known, the containers of the above mentioned type, after having been filled with hot—for example at about 85° C.—pourable products or liquids, are first subjected to a capping operation and then cooled so as to return to a room temperature. By effect of the capping operation, the heated air present in the top portion ("head space") of the container expands causing a stress tending to produce a general swelling of the container at the side wall and at the base wall.

The following cooling to which the container is subjected, causes, vice versa, a reduction of the volume of air and minimally of the liquid product contained in the container; a depression is therefore created, which tends to pull the side walls and the base wall of the container inwards. This may determine deformations in the walls of the container if these are not rigid enough to resist the action of the above disclosed stresses.

In order to contain the depressive stresses generated during the cooling of the product within the containers without generating undesired deformations on the containers, they are typically provided, at the side wall, with a series of vertical panels, known as "vacuum panels". These panels, in the presence of depressive stresses, are deformed inwardly of the container allowing it to resist to the hot fill process without generating undesired deformations in other areas of the container.

Likewise, the known containers intended to be subjected to a hot fill process can also have an optimised lower portion or base adapted to be deformed upwards under the action of the depressive stresses.

Even though the disclosed solutions allow to "relieve" the pressure stresses on specific parts of the containers, i.e. the vertical vacuum panels or the base, thus avoiding the occurrence of undesired deformations in other parts of the containers, they do not allow the cancellation of the above said stresses; in other words, the containers remain in any case subject to internal depressive stresses and must therefore be provided with a structure capable of resisting such stresses.

Patent application WO2006/068511 shows a container having a deformable base, which can have two different configurations: a first unstable configuration, in which this base has a central area projecting downwards with respect to the outermost annular peripheral area immediately adjacent thereto, and a second stable configuration, in which the central area is retracted inwardly of the container, i.e. it is arranged in a higher position with respect to the adjacent peripheral area.

Following the filling with the hot pourable product, the base of the container has the first unstable configuration and must be supported by a special cup element to which it is coupled. Thereby, the downward deformation of the base of the container can be maximised without compromising the stable support of the container, since such a support is provided by the cup element. Following the cooling, the base can be deformed by an external action, for example a vertical thrust upwards performed by a deforming rod or plunger, in the second stable configuration with the subsequent possibility of removing the cup element.

The deformation of the base of the container from the first to the second configuration determines a considerable reduction of the containment volume of the container, much higher than would be obtained in the known containers simply by the deformation of the base by the effect of the sole depressive stresses; the final effect is therefore substantially the cancellation of the depressive stresses acting on the inside of the container.

The applicant has observed that this kind of operation is quite critical, as the final configuration of the container after the deformation depends on a plurality of factors, connected not only to the way in which such operation is performed but also to the initial condition of the container subjected to deformation.

In particular, the applicant has observed that a non-correctly filled container, i.e. a container overfilled or filled below the desired level, may react to the deforming action of the plunger in a non predictable way: for instance, an overfilled container may be deformed insufficiently at its base, with possible return of the plastic material towards the original first configuration after release of the plunger; alternatively, a non-sufficiently filled container may be broken by the action of the plunger.

Similarly, the deforming plunger may produce an incorrect deformation on the container, if the latter is not correctly positioned with respect to the plunger itself.

It should be also noted that an incorrect deformation of the container may affect the subsequent application of the label. As known, a label requires a receiving surface having a well-defined geometry as well as a sufficient rigidity. This second feature of the receiving surface is particularly important for self-stick labels or pressure-sensitive labels.

DISCLOSURE OF INVENTION

It is therefore an object of the present invention to find a simple and cost-effective way to check, in a reliable and repeatable manner, the quality of the containers subjected to the deformation operations.

This object is achieved by a container handling machine as claimed in claim 1.

The present invention also relates to a container handling method as claimed in claim 14.

BRIEF DESCRIPTION OF THE DRAWINGS

A preferred embodiment is hereinafter disclosed for a better understanding of the present invention, by mere way of non-limitative example and with reference to the accompanying drawings, in which:

FIG. 2 shows a larger-scale, partial sectional side view of an operative unit of the machine of FIG. 1, with a deforming plunger in a first condition;

FIG. 3 shows a larger-scale, partial sectional side view of the operative unit of FIG. 2, with the deforming plunger in a second condition, at the end of a deformation operation on a relative container;

FIG. 4 shows a larger-scale, partial sectional side view of the operative unit of FIGS. 2 and 3, during a check step for checking correctness of the deformation operation carried out by the deforming plunger on the relative container;

FIG. 5 shows a larger-scale partial sectional side view of the operative unit of FIGS. 2 to 4, with the deforming plunger acting on an overfilled container;

FIGS. 6 to 8 show larger-scale, partial sectional side views of the operative unit of FIGS. 2 to 4, with the deforming plunger acting on a non-correctly centered container;

BEST MODE FOR CARRYING OUT THE INVENTION

Figure 1:
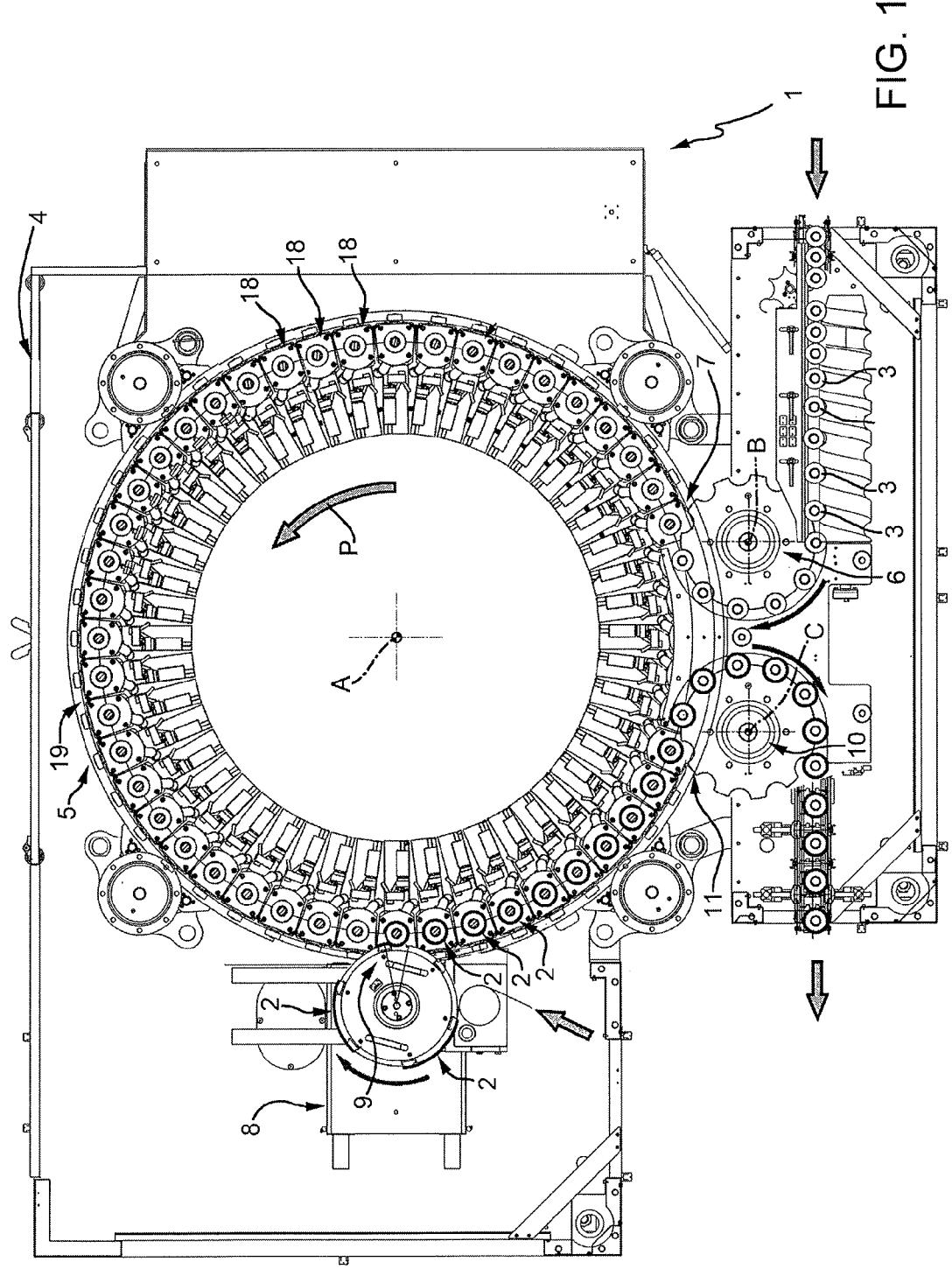
FIG. 1 shows a diagrammatic plan view, with parts removed for clarity, of a container handling machine according to the present invention.

With reference to FIG. 1, numeral 1 indicates as a whole a handling machine for applying labels 2 on filled and closed containers, in particular plastic bottles 3, and for deforming said bottles 3 so as to transform them into a desired final configuration.

Machine 1 essentially comprises a support structure 4 (only partially visible in FIG. 1) and a carousel 5 mounted on support structure 4 in a rotatable manner about a vertical central axis A.

Carousel 5 receives a sequence of bottles 3 to be labelled by an inlet star wheel 6, which cooperates with carousel 5 at a first transfer station 7 and is mounted to rotate about a longitudinal axis B parallel to axis A.

Carousel 5 also receives a sequence of rectangular or square labels 2 from a labelling unit 8 (known per se and only diagrammatically shown), which cooperates with carousel 5 at a second transfer station 9.

Carousel 5 releases a sequence of labelled bottles 3 to an outlet star wheel 10, which cooperates with carousel 5 at a third transfer station 11 and is mounted to rotate about a longitudinal axis C parallel to axes A and B.

As may be seen in detail in FIGS. 2 to 4, each bottle 3 has a longitudinal axis D, a base 12 and a removable cap 17, which is applied on an open neck 13 of the bottle 3 and defines an end of the bottle 3 itself opposite the base 12.

In the case shown, base 12 has an annular peripheral area 15 having axis D, radially external and defining an annular resting surface of relative bottle 3, and a recessed central area 16, surrounded by peripheral area 15 and arranged normally higher along axis D with respect to the peripheral area 15 in a vertical position of bottle 3, i.e. with neck 13 placed above base 12; in other words, central area 16 is arranged at a distance from neck 13 along axis D smaller than the distance between neck 13 and peripheral area 15.

Base 12 is deformable and can have two different configurations, shown in FIGS. 2 to 4. In the first configuration (FIG. 2), central area 16 of base 12 is deformed and swollen downwards, i.e. it is arranged at a maximum distance from neck 13 along axis D so as to define a maximum internal volume of bottle 3; in the second configuration (FIGS. 3 and 4), reached when the bottle 3 is correctly deformed, central area 16 is instead retracted inwardly of relative bottle 3 with respect to the first configuration, i.e. central area 16 is arranged at a smaller distance along axis D from neck 13 with respect to the first configuration. It is apparent that bottles 3 have, in the second configuration of base 12, a containing volume smaller than that in the first configuration.

Bottles 3 are fed to carousel 5 in a condition in which they have been filled with the pourable product, normally a liquid food product, and closed, at neck 13, with cap 17.

In the case shown, bottles 3 are fed to carousel 5 after having been hot filled and subjected to a cooling operation. Base 12 is therefore arranged in the first configuration, i.e. it is deformed and swollen downwards, and within bottle 3 there are depressive stresses which tend to displace base 12 towards the second configuration.

Bottles 3 reach carousel 5 in a vertical position, i.e. with base 12 arranged on the bottom with respect to neck 13 and to cap 17 and with axis D parallel to axes A, B and C.

Bottles 3 are released to outlet star wheel 10 with base 12 in the second configuration, which is reached when the bottles 3 are correctly deformed and corresponds to the desired final configuration of the bottles 3 themselves.

Carousel 5 comprises a plurality of operative units 18 (only one of which shown in detail in FIGS. 2 and 3), which are uniformly distributed about axis A and are mounted at a peripheral portion of carousel 5.

Operative units 18 are displaced by carousel 5 along a circular processing path P which extends about axis A and through transfer stations 7, 9 and 11. In particular, by considering path P (FIG. 1), transfer station 7, in which bottles 3 are fed to carousel 5, is arranged upstream of transfer station 9 for feeding labels 2, and this latter station is clearly arranged upstream of transfer station 11, in which labelled bottles 3 are fed to outlet wheel 10.

As may be seen in FIGS. 2 and 3, operative units 18 are fixed to a horizontal rotating table 19 of carousel 5, have respective axes E parallel to axes A, B, C and orthogonal to path P, and extend coaxially through respective throughholes 20 of rotating table 19 and on both sides thereof.

Each operative unit 18 is adapted to receive a relative bottle 3 in a vertical position, i.e. having its axis D coaxial to relative axis E with neck 13 placed above base 12, and to retain this bottle 3 in the above said position along path P from transfer station 7 to transfer station 11.

Since operative units 18 are identical to one another, only one will be disclosed in detail hereinafter for clarity and simplicity; it is evident that the features that will be hereinafter disclosed are common to all operative units 18.

In particular, operative unit 18 comprises, above rotating table 19, a resting element 21 adapted to define a horizontal support for base 12 of a relative bottle 3. In greater detail, resting element 21 comprises a plate 22 extending orthogonally to axis E and having, on top, a horizontal resting surface 23 for supporting base 12 of relative bottle 3. In practice, peripheral area 15 is the only part of bottle 3 contacting resting surface 23, being central area 16 retracted along axis D with respect to peripheral area 15 in both first and second configuration of base 12.

Plate 22 is advantageously provided with an upper central recess 22a for receiving base 12 of a relative bottle 3 as well as for centering such bottle 3 with respect to the relative axis E, i.e. with its axis D coaxial to the axis E.

As can be seen in FIGS. 2 and 3, each bottle 3, when housed on the relative operative unit 18, is also locked on top by a retaining unit 24 cooperating with cap 17 of the bottle 3, i.e. with the end of the bottle 3 opposite base 12.

In particular, retaining unit 24 comprises a bottom head 24a defining a receiving seat 24b adapted to be engaged in use by cap 17 of the relative bottle 3.

Retaining unit 24 is advantageously moved along axis E between a retracted or rest position, in which its head 24a is arranged at a maximum distance from resting surface 23 of resting element 21 along the axis E itself, and an advanced or operative position (FIGS. 2 to 4), in which its head 24a is closer to the resting surface 23 than in the rest position and locks the relative bottle 3 in its vertical position on resting element 21.

Displacements of retaining unit 24 between the rest position and the operative position are controlled by a cam 25 fixed to support structure 4 of machine 1, extending parallel to path P and cooperating with a cam follower 26 carried by the retaining unit 24 itself. In particular, cam follower 26 of retaining unit 24 slides along cam 25.

Retaining unit 24 is set in the operative position during movement of operative unit 18 along path P from transfer station 7 to transfer station 11 and is set in the rest position from transfer station 11 to transfer station 7. More specifically, retaining unit 24 is moved from the rest position to the operative position, after a relative bottle 3 is received on resting element 21, and is moved from the operative position to the rest position to release the bottle 3 at transfer station 11.

In order to produce these movements, cam 25 has, at stations 7 and 11, respective ramp-shaped operative portions (not shown) connected to one another by respective horizontal portions (like the one shown in FIGS. 2 to 4).

Retaining unit 24 is advantageously maintained in its operative position, i.e. with its head 24a at a constant distance along axis E from resting surface 23 of resting element 21 during the entire movement of operative unit 18 along path P from transfer station 7 to transfer station 11, and therefore during the deformation operation carried out on base 12 of bottle 3 from the first configuration to the second configuration.

Resting element 21 is also fixed to a rotating member 27 of a relative electric motor 28, so as to be rotated about axis E when relative bottle 3 receives a label 2 from labelling unit 8.

In particular, electric motor 28 comprises a hollow cylindrical stator 29, protrudingly fixed to the lower side of rotating table 19 about hole 20 and coaxially thereto; more precisely, stator 29 has a top end 29a fixed to a lower face of rotating table 19 and protrudes on the lower side of rotating table 19.

Rotating member 27, also cylindrical and hollow, is mounted for the most part within stator 29 and projects on top therefrom so as to engage coaxially and pass through hole 20 of rotating table 19 of carousel 5. Rotating member is mounted in a rotatable manner about axis E with respect to stator 29 and to rotating table 19; in other words, rotating member 27 rotatingly engages hole 20 of rotating table 19.

Resting element 21 finally protrudes from the top of rotating member 27.

Plate 22 of resting element 21 has a through opening 30 coaxial to axis E, and operative unit 18 also comprises a deforming plunger 31, which is borne by rotating table 19 of carousel 5, on the opposite side of resting element 21 with respect to bottle 3, and is selectively displaceable along axis E, with respect to the resting element 21, to act, through opening 30, on base 12 of relative bottle 3 and deform it from the first to the second configuration.

In particular, plunger 31 has a substantially cylindrical main portion 32, which axially and slidingly engages a central through-hole 33 having axis E of rotating member 27 and is selectively displaceable between a first position (FIG. 2), in which it is spaced from base 12 of bottle 3 borne by resting element 21, and a second position (FIG. 3), in which it engages opening 30 of resting element 21 and has completed deformation of base 12 of bottle 3 to the second configuration.

Plunger 31 is axially coupled to a driving element 34 of an actuator assembly 35, in particular a linear motor 36.

According to a possible variant (not shown), plunger 31 may be directly defined by driving element 34 of actuator assembly 35.

According to another possible variant (not shown), plunger 31 may be driven by an electric motor of rotary type, coupled with a worm screw, in turn connected to the plunger 31 itself.

Actuator assembly 35 is arranged on the opposite side of electric motor 28 with respect to resting element 21.

In the case shown, actuator assembly 35 comprises an outer casing 37 which protrudes by means of a flanged sleeve 38 from a lower end 29b of stator 29, opposite to end 29a and provided with a through hole 29c.

Driving element 34 is partially engaged in a sliding manner along axis E in housing 37 and projects on top therefrom with an end portion coupled to plunger 31.

Preferably, plunger 31 is axially coupled to driving element 34 so that they can move as one single piece along axis E, and is rotationally free with respect to driving element 34 so that any rotational movement impressed by rotating member 27 to plunger 31 is not transmitted to the driving element 34 itself.

As may be seen in FIGS. 2 and 3, main portion 32 of plunger 31 engages hole 29c of end 29b of stator 29 and hole 33 of rotating member 27 in a sliding manner and ends on top with a head 40 which interacts with base 12 of the relative bottle 3.

It should be noted that, in the first position of plunger 31 (FIG. 2), head 40 is spaced from base 12 of the relative bottle 3 and is in particular located below the plane defined by resting surface 23, so as to not hamper feed or release of each bottle 3 to/from the relative operative unit 18.

In the second position of plunger 31, head 40 is coupled with central portion 16 of base 12 of the relative bottle 3.

To sum up, in the disclosed configurations of operative unit 18, stator 29, rotating member 27, resting element 21, actuator assembly 35 and plunger 31 move with rotating table 19 about axis A.

As shown in FIGS. 2 and 3, main portion 32 of plunger 31 has a splined zone 32a angularly coupled with rotating member 27; therefore, in addition to the rotational movement about axis A, rotating member 27, resting element 21 and plunger 31 can rotate about axis E with respect to the other components of operative unit 18.

Finally, plunger 31 and driving element 34 can translate along axis E with respect to the other components of operative unit 18.

With reference to FIGS. 2 to 4, machine 1 further comprises a control unit 41 configured to selectively activate actuator assembly 35 and electric motor 28 of each operative unit 18: in the first case, activation of one actuator assembly 35 produces displacement of the relative plunger 31 along its axis E; in the second case, activation of one electric motor 28 produces rotation of the relative plunger 31 and resting element 21 about axis E.

Control unit 41 advantageously comprises:
measuring means 42 for measuring a physical quantity I correlated to the maximum deforming force F exerted by each plunger 31 on base 12 of the relative bottle 3 during the deformation operation of the base 12 itself in order to determine whether the bottle 3 is correctly filled; and
comparator means 43 for comparing measured values $I_O$ of physical quantity I with a threshold value $I_V$ or a threshold range $I_R$ of the same physical quantity I.

On the basis of the above measures and comparisons, control unit 41 generates a reject signal R for rejecting the defective bottle 3 found on a given operative unit 18 when the measured value $I_O$ of physical quantity I differs from the threshold range $I_R$ or differs from the threshold value $I_V$ of a given amount.

In this way, it is possible to detect whether the bottles 3 are correctly filled, overfilled or filled below a predetermined level.

In the example shown, the reject signal R is generated by control unit 41 when the measured value $I_O$ of physical quantity I for a given operative unit 18 exceeds threshold value $I_V$ or threshold range $I_R$, so indicating that the relative bottle 3 is overfilled.

The measured physical quantity I is preferably the electrical current absorbed by each linear motor 36 during the deformation operation carried out on base 12 of a relative bottle 3.

FIG. 5 shows an example of an overfilled bottle 3 subjected to a deformation operation on its base 12 by a relative plunger 31.

Figure 9:
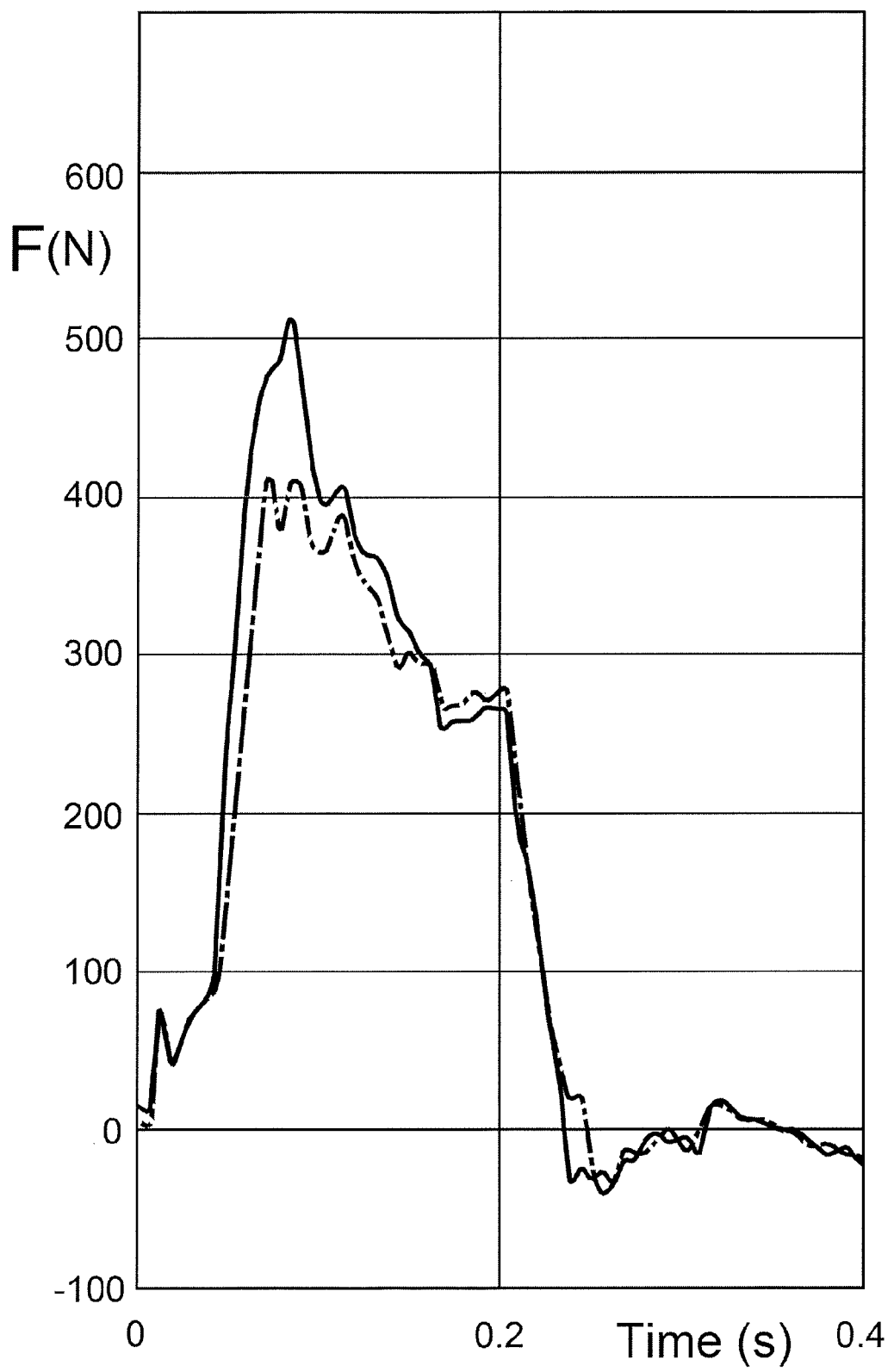
FIG. 9 is a graph showing the variation, in the course of time, of the deforming force applied on differently-filled containers by the deforming plunger of the operative unit of FIGS. 2 to 4 during the deformation operation.

The graph of FIG. 9 shows the variation, in the course of time, of the deforming force F applied on bases 12 of differently-filled bottles 3 by one operative unit 18 during the deformation operation. As clearly visible in such graph, the deforming force F required for a bottle 3 completely full (continuous line), like the one shown in FIG. 4, is on average 20% higher than the one required for a correctly filled bottle 3 (dot-and-dash line).

With reference to FIGS. 2 to 4, control unit 41 is advantageously configured to activate actuator assembly 35 of each operative unit 18 twice along path P:
a first time for producing a first stroke (FIGS. 2 and 3) of the relative plunger 31 along its axis E from the first position to the second position and vice versa, in order to perform a deformation operation on base 12 of the relative bottle 3; and
a second time, after the deformation operation, for producing a second stroke (FIG. 4) of the plunger 31 along its axis E, with a lower force than in the first stroke and directed towards the same bottle 3 previously deformed, in order to check whether the deformation operation on the bottle 3 itself occurred in the right way.

It is pointed out that, during both first and second stroke of each plunger 31, the corresponding retaining unit 24 is advantageously maintained in its operative position, with its head 24a at a constant distance along axis E from resting surface 23 of the relative resting element 21.

The second stroke of each plunger 31 starts from the first position and ends at contact with the deformed base 12 of the relative bottle 3 (final position). In practice, plungers 31 are used in their second strokes like probes to check correctness of the deformations imparted on bottles 3.

As already mentioned, during the second stroke, each plunger 31 is activated with a limited force, which is in particular lower than the force necessary to produce a deformation on the deformed base 12 of the relative bottle 3.

With reference to FIGS. 2 to 8, each operative unit 18 further comprises sensor means 45 adapted to detect the displacement performed by the relative plunger 31 along its axis E during the second stroke.

In the example shown, sensor means 45 of each operative unit 18 comprise a position transducer 46 (known per se and only schematically disclosed) adapted to detect the length of the second stroke travelled by the relative plunger 31 and to generate an outlet signal W correlated to the detected length.

On the basis of the detections performed by sensor means 45, control unit 41 generates a reject signal T for rejecting the defective bottle 3 when the detected length of the second stroke travelled by the relative plunger 31 is lower than a threshold value $S_V$, correlated to the theoretical distance that each plunger 31 should travel during the first stroke from the first position to the second position in case of correct deformation of the relative bottle 3.

The applicant has observed that the length of the second stroke is lower than threshold value $S_V$ in the following cases:
when the deformation operation on base 12 of the relative bottle has not been completed in the right way, with a consequent possible partial return of the plastic material of the base 12 itself towards the first configuration; and/or
when a bottle 3 has not been correctly centered on the relative operative unit 18, i.e. the axis D of such bottle 3 is not coaxial to the axis E of the operative unit 18, so that the action of the relative plunger 31 during the first stroke causes a possible increase of the misalignment between the axes D and E (see FIGS. 6 to 8).

Figure 8:
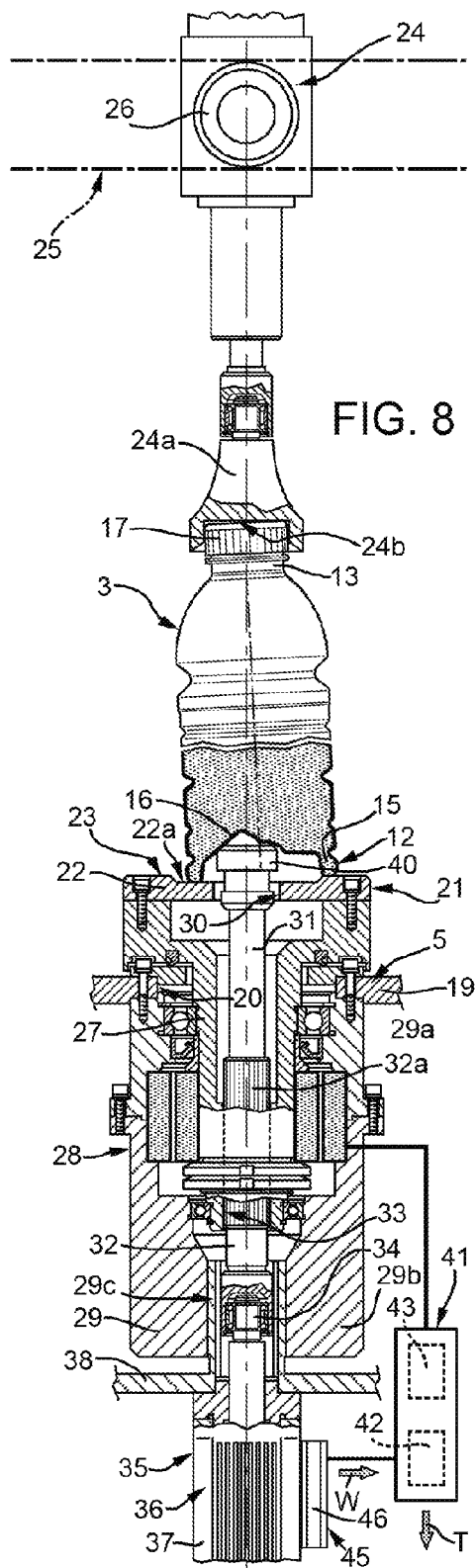

In particular, in the second case, incorrect centering of the bottle 3 on the relative operative unit 18 is normally caused by the fact that the base 12 of such bottle 3 is not completely housed within recess 22a of the relative plate 22 (see FIGS. 6 to 8).

Figure 10:
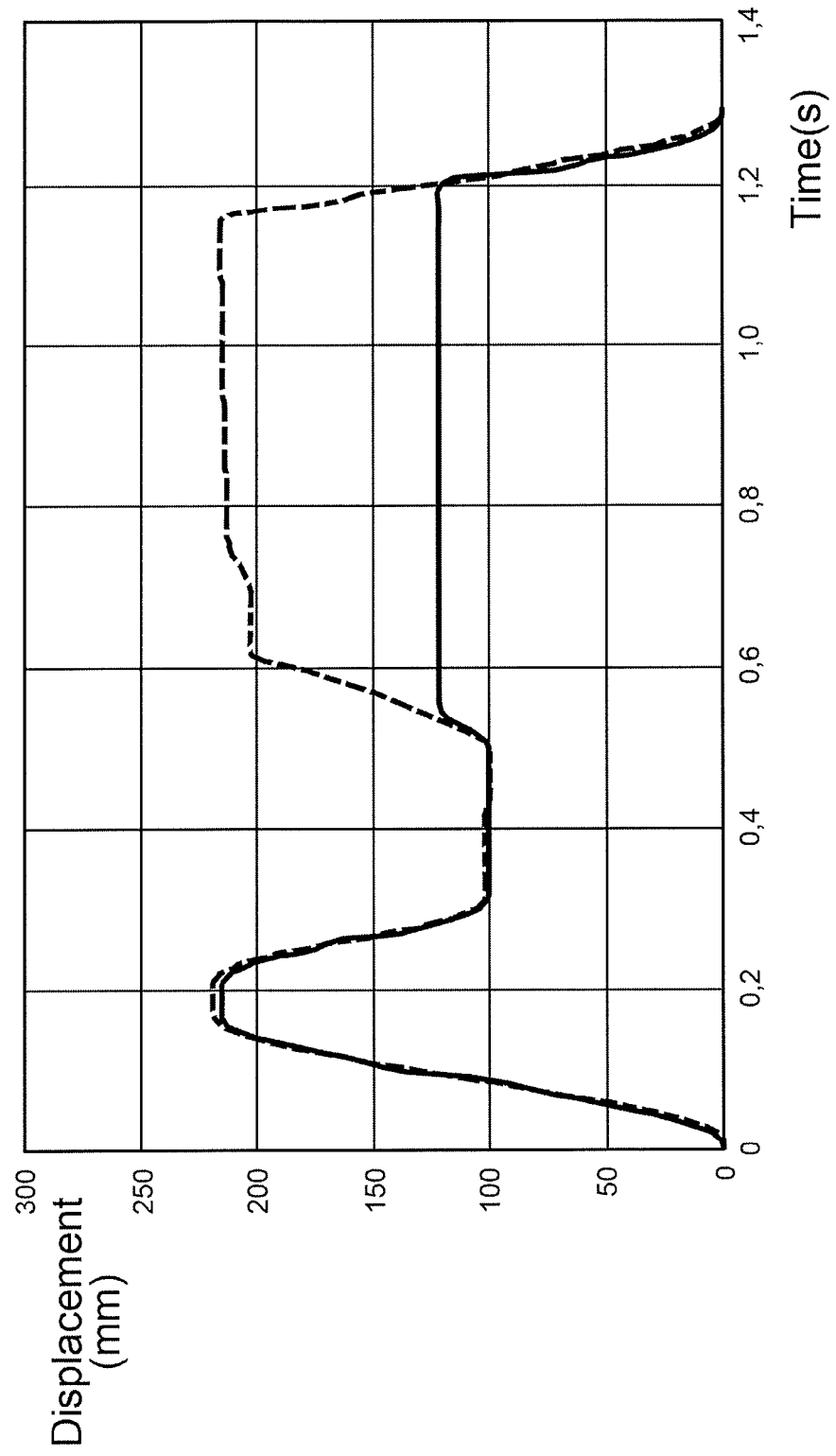
FIG. 10 is a graph showing the variation, in the course of time, of the displacements of the deforming plunger of the operative unit of FIGS. 2 to 8 during the deformation operation carried out on containers in different conditions and during the subsequent check step.

The graph of FIG. 10 shows the variation, in the course of time, of the displacements of plunger 31 of one operative unit 18 during the first and second stroke in connection with two bottles 3 in different conditions.

As clearly visible in such graph, the displacements of the plunger 31 in the first and second stroke are the same for a bottle 3 correctly centered on the relative operative unit 18 and correctly deformed during the deformation operation (dotted line).

In a completely different manner, in the case of a bottle 3 not correctly centered on the relative operative unit 18 (continuous line), for instance with a maximum deviation of 5 mm of axis D from axis E, the displacement of the relative plunger 31 in the second stroke is 15% lower than in the first stroke.

In use, after being filled with a hot pourable product, for example a liquid food product at about 85° C., capped with respective caps 17 and cooled in order to be taken at the desired temperature, bottles 3 sequentially reach the different operative units 18 of machine 1.

In particular, as known, by the effect of the capping operation, heated air present in the top portion of each bottle 3, between the product and relative cap 17, expands causing a stress that tends to produce a general swelling of bottle 3. During this step, bases 12 of bottles 3 are deformed assuming the first configuration shown in FIG. 2.

It may be noted, also in the above said first configuration, that central area 16 of base 12 of each bottle 3 does not project downwards beyond adjacent peripheral area 15; thereby, peripheral area 15 always ensures a stable support for the relative bottle 3.

During the subsequent cooling operation, depressive stresses are generated within bottles 3 and tend to shrink them.

At transfer station 7, inlet star wheel 6 feed bottles 3 to machine 1 in vertical positions, i.e. with axes D parallel to central axis A and coaxial to axes E of respective operating units 18.

In particular, each bottle 3 is arranged resting on plate 22 of a relative operating unit 18, centered within recess 22a and locked on top by head 24a of the relative retaining unit 24.

During the movement of bottles 3 from transfer station to transfer station 9, control unit 41 sequentially activates respective actuator assemblies 35 so as to produce the first strokes of respective plungers 31 from their first positions to their second positions and to cause deformation of bases 12 of bottles 3 from the first to the second configuration; in this way, depressive stresses acting within bottles 3 are cancelled.

In practice, considering a single operative unit 18, the activation of relative actuator assembly 35 causes the displacement along axis E of relative plunger 31 so that head 40 completely passes through opening 30 of relative resting element 21 and pushes central area 16 of base 12 of the relative bottle 3 upwards until it is taken to the second configuration. During this displacement of plunger 31, and therefore during the deformation operation on the base 12 of the relative bottle 3, head 24a of the corresponding retaining unit 24 is maintained at a constant distance along axis E from resting surface 23 of the resting element 21.

The maximum deforming force F exerted by plunger 31 on base 12 of the relative bottle 3 is measured by measuring means 42 of control unit 41 in order to check whether the bottle 3 itself is correctly filled.

In particular, maximum deforming force F is measured by detecting a correlated physical quantity I, in the example shown the electric current absorbed by linear motor 36 during the deformation operation.

More specifically, the measured values $I_0$ of physical quantity I are compared by comparator means 43 of control unit 41 with threshold value $I_V$ or threshold range $I_R$ of physical quantity I.

A reject signal R is generated by control unit 41 when the measured value $I_0$ of physical quantity I differs from threshold range $I_R$ or differs from threshold value $I_V$ of a given amount.

In the example shown, reject signal R is generated by control unit 41 when the measured value $I_0$ of physical quantity I exceeds threshold value $I_V$ or threshold range $I_R$, indicating that the bottle 3 involved in this measuring is overfilled (see FIG. 4 and continuous line in the graph of FIG. 5).

On the basis of reject signal R, the defective bottle 3 detected by control unit 41 is subsequently rejected, e.g. downstream of machine 1.

After the deformation operation, control unit 41 activates once more actuator assembly 35 to produce the second stroke of plunger 31 along axis E from the first position to the final position, in which head 40 of the plunger 31 itself contacts the deformed base 12 of the bottle 3 previously deformed.

This second stroke of plunger 31 is performed with a lower force than in the first stroke so as to not produce further deformations to the deformed bottle 3 but simply to check whether the deformation operation on such bottle 3 occurred in the right way.

During the second stroke of plunger 31, head 24a of the corresponding retaining unit 24 is maintained at a constant distance along axis E from resting surface 23 of the resting element 21.

On the basis of the detections made by sensor means 45, a reject signal T is generated by control unit 41 when the detected length of the second stroke travelled by the plunger 31 is lower than threshold value $S_V$.

In particular, by detecting the displacement made by plunger 31 in the second stroke, it is possible to check whether the bottle 3 has been correctly centered on the relative operative unit 18 and/or correctly deformed during the first stroke.

The deformation of base 12 produces an increase of the internal pressure of the relative bottle 3 as well as a consequent stiffening of the outer surface of the bottle 3 itself, which enables a very precise and accurate application of a relative label 2.

In particular, the labelling operation is performed immediately after the end of the second stroke of plunger 31.

More specifically, plunger 31 is maintained in its final position at contact with the deformed base 12 of the bottle 3, which should correspond to the second position if the deformation operation has been correctly carried out, and the bottle 3 is ready to receive the relative label 2.

In order to obtain winding of the label 2 on the relative bottle 3, control unit 41 activates electric motor 28 of relative operative unit 18; relative resting element 21 and plunger 31 are therefore rotated about axis E with a corresponding rotation of bottle 3 borne thereby; due to the particular coupling between plunger 31 and driving element 34, this latter element does not rotate.

The application of the label 2 on the relative bottle 3 is thus completed along the remaining portion of path P, until bottle 3 is fed to outlet wheel 10 at transfer station 11.

Prior to release bottles 3 to outlet wheel 10, plungers 31 are moved along axis E to their first positions, so as to not hamper the lateral displacement of bottles 3 towards outlet wheel 10.

As it appears from the above description, the quality of each bottle 3 subjected to deformation is checked by simply:
  measuring the deforming force F applied by the relative plunger 31 on such bottle 3 during the deformation operation; and
  using the same plunger 31 as a probe in a further stroke carried out after the stroke for producing the deformation of the base 12 of the bottle 3 itself.

In particular, the applicant has observed that, through the above-listed checks, it is possible to understand, in a reliable and repeatable manner, whether each bottle 3 is:
  correctly filled with the pourable product; and
  correctly positioned and centered on the relative operative unit 18.

These parameters have a relevant influence on the quality of the deformation produced on the bases 12 of the bottles 3.

It should be also noted that machine 1 is configured to perform both the labelling operation of bottles 3 and the operation of transforming bases 12 of bottles 3 from the first to the second configuration. This is obtained without modifying the path normally performed by operative units 18 on a typical labelling machine and without any intervention on the sequence of the operations traditionally performed to apply labels 2 on bottles 3.

Furthermore, the adoption of machine 1 within a normal processing plant of bottles 3 allows to obtain, the same operations being performed, a reduction both of the number of machines employed and of the number of conveyors for transferring the above said bottles 3 from a machine to another. This also translates into a significant reduction of the overall space occupied by the resulting processing plant with respect to the known plants.

Finally, it is clear that modifications and variants to machine 1 and the method disclosed and shown herein can be made without departing from the scope of protection as defined in the accompanying claims.

The invention claimed is:

1. A container handling machine, the machine comprising:
   at least one operative unit for handling a container having a base;
   a first support unit configured to support the base of the container;
   a second support unit configured to cooperate with an end of the container opposite the base;
   a plunger configured to selectively move along a longitudinal axis and to deform the base of the container from a first configuration, in which the base is in an enlarged state that defines a first internal volume of the container, to a second configuration, in which the base is at least in part inwardly retracted with respect to the first configuration so as to define a second internal volume of the container that is smaller than the first volume of the first configuration;
   an actuator including an electric motor configured to selectively move the plunger along the longitudinal axis between a first position, in which the plunger is detached from the base of the container, and a second position, in which the plunger deforms the base to the second configuration; and
   a control unit configured to:
      selectively activate the actuator for producing a first stroke of the plunger along the longitudinal axis between the first position and the second position, in order to deform the base of the container; and
      selectively activate the actuator after deforming the base of the container for producing a second stroke of the plunger along the longitudinal axis, with a lower force than in the first stroke and directed towards the container previously deformed, in order to check a deformation of the base of the container and without producing a further deformation of the deformed base of the container,
      wherein the control unit is further configured to measure at least a physical quantity reflecting an electric current absorbed by the electric motor when the base is deformed to check a deformation of the container.

2. The machine of claim 1, wherein the second stroke of the plunger starts from the first position and ends at contact with the deformed base of the container.

3. The machine of claim 1, further including a sensor configured to detect the displacement along the longitudinal axis performed by the plunger during the second stroke.

4. The machine of claim 3, wherein the sensor is configured to generate an outlet signal associated with the length of the second stroke travelled by the plunger.

5. The machine of claim 4, wherein the control unit is configured to generate a first reject signal for rejecting the container when the detected length of the second stroke travelled by the plunger is lower than a threshold value associated with the theoretical distance travelled by the plunger during the first stroke from the first position to the second position.

6. The machine of claim 1, wherein the second support unit is maintained at a constant distance along the longitudinal axis from the first support unit during the first and second strokes.

7. The machine of claim 1, wherein the control unit is configured to generate a second reject signal for rejecting the container when the measured value of the electric current differs from a threshold range or differs from a second threshold value.

8. The machine of claim 7, wherein the second reject signal is generated by the control unit when the measured value of the electric current exceeds the second threshold value or the threshold range, indicating that the container is overfilled.

9. The machine of claim 1, further including a transportation unit for moving the operative unit and the container along a processing path transverse to the longitudinal axis, and a labelling unit configured to apply a label onto an outer surface of the container while the operative unit and the container are being moved by the transportation unit along the processing path.

10. The machine of claim 9, wherein the operative unit further includes a second actuator carried by the transportation unit configured to rotate the first support unit about the longitudinal axis while the label is applied onto the container.

11. A method for handling a container having a base, the method comprising:
    receiving the container in an operative unit having a first support unit configured to support a base of the container, and a second support unit configured to cooperate with an end of the container opposite the base;
    moving a plunger along a longitudinal axis to perform a first stroke between a first position, in which the plunger is detached from the base of the container, and a second position, in which the plunger interacts with the base;
    deforming, through moving the plunger along the longitudinal axis during the first stroke, the base of the container from a first configuration, in which the base is in an enlarged state that defines a first internal volume of the container, to a second configuration, where the plunger is in the second position and in which the base is at least in part inwardly retracted with respect to the first configuration so as to define a second internal volume of the container that is smaller than the first volume of the first configuration; and
    moving the plunger along the longitudinal axis after the base is deformed to perform a second stroke, with a lower force than in the first stroke and directed towards the container previously deformed, in order to check a deformation of the base of the container.

12. The method of claim 11, wherein the second stroke of the plunger starts from the first position and ends at contact with the deformed base of the container.

13. The method of claim 11, further including detecting the displacement along the axis performed by the plunger during the second stroke.

14. The method of claim 13, further including generating an outlet signal associated with the length of the second stroke travelled by the plunger.

15. The method of claim 14, further including generating a first reject signal for rejecting the container when the detected length of the second stroke travelled by the plunger is lower than a first threshold value associated with the theoretical distance travelled by the plunger during the first stroke from the first position to the second position.

16. The method of claim 11, wherein, during the second stroke, the plunger is activated with a limited force, lower than the force necessary to produce a deformation on the deformed base of the container.

17. The method of claim 11, further including maintaining the second support unit at a constant distance along the longitudinal axis from the first support unit during the first and second strokes.

18. The method of claim 17, further including measuring a physical quantity associated with a deforming force exerted by the plunger on the base of the container during the first stroke in order to determine whether the container is correctly filled.

19. The method of claim 18, further including generating a second reject signal for rejecting the container when the measured value of the physical quantity differs from a second threshold range or differs from a threshold value.

20. The method of claim 19, wherein the second reject signal is generated when the measured value of the physical quantity exceeds the second threshold value or the threshold range, indicating that the container is overfilled.

21. The method of claim 18, wherein the plunger is moved by an electric motor, and wherein the physical quantity is the electrical current absorbed by the electric motor when the base is deformed.

22. The method of claim 11, further including:
moving the operative unit and the container along a processing path transverse to the longitudinal axis; and
applying a label onto an outer surface of the container while the operative unit and the container are being moved along the processing path.

* * * * *